United States Patent Office 3,290,385
Patented Dec. 6, 1966

3,290,385
BIS(ALLYLOXYMETHYL)NAPHTHALENE
John O'Brochta, Pittsburgh, Pa., assignor to Koppers Company, Inc., a corporation of Delaware
No Drawing. Filed Apr. 1, 1963, Ser. No. 269,806
1 Claim. (Cl. 260—611)

This invention relates generally to allyl ethers.

Allyl compounds are widely used in the production of resins and as plasticizers for resins. Allyl compounds readily copolymerize with a wide variety of other polymeric-forming monomers, such as, vinyl esters, and esters of methacrylic and maleic acids. Yet, the tendency for polymerization of the monomeric allyl compounds is sufficiently low that the compounds can be purified and handled in a conventional manner without undue polymerization. The capacity of the allyl compounds to crosslink, that is, to polymerize to thermoset polymers without evolution of volatile by-product avoids the application of pressures that is usually required with conventional thermosetting resins of the condensation type.

There has now been discovered, in accordance with this invention, a novel colorless, low viscosity, liquid, allyl ether, bis(allyloxymethyl)naphthalene. The novel allyl ethers are readily prepared by the reaction of a bis(chloromethyl)naphthalene with allyl alcohol in the presence of sodium hydroxide as illustrated below. For example, when bis(chloromethyl)naphthalene is used, the resulting compound is bis(allyloxymethyl)naphthalene.

(chloromethyl)naphthalene is dried under a vacuum and then purified by recrystallization with acetone. The product is about an equal mixture of the 1,4- and 1,5-isomers of bis(chloromethyl)naphthalene.

Into a flask was charged 364.6 grams of allyl alcohol (8.0 moles), 82 grams of sodium hydroxide (2.04 moles) and 10 grams of water. The flask was heated to about 80° C., dissolving most of the caustic. Thereafter, 225 grams of bis(chloromethyl)naphthalene (1.0 mole) was charged slowly as a powder to the stirred solution over a period of two hours. The reaction mixture was then heated to boiling in thirty minutes and excess alcohol distilled off. The residue was filtered to remove the sodium by-product sodium chloride and the excess allyl alcohol distilled under vacuum to obtain the bis(allyloxymethyl)naphthalene in 74% yield, distilling at 170–177° C. under 6 millimeters vacuum. The bis(allyloxymethyl)naphthalene was a colorless oily liquid having about the same viscosity as xylene and an iodine number of 189.

*Example II*

A mixture by weight of 10 parts bis(allyloxymethyl) naphthalene and 1 part of boron trifluoride etherate was held at −50° for about 10 minutes. Then 20 parts of styrene was added and the mixture vigorously shook, until a viscous but still flowing mass resulted. The mass was poured into a mold and heated to 100° C. for one hour whereupon a clear solvent-resistant polymer was formed.

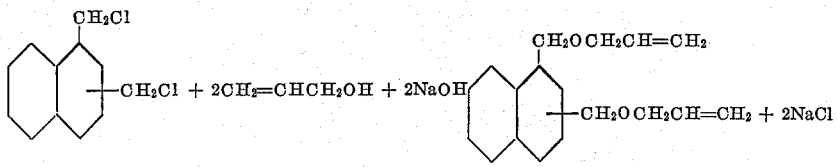

The allyloxymethyl naphthalene may be used as monomers per se, as reactive plasticizers, or as modifying coreactants in formulations with polyesters, vinyl polymers, and the like.

The chloromethyl naphthalenes may be readily prepared in accordance with the process described in United States Patent No. 1,910,462. This process involves the reaction of naphthalene, formaldehyde and hydrogen chloride.

The allyl alcohol may be the conventional commercial grade-allyl alcohol.

The reaction of the allyl alcohol and bis(chloromethyl) naphthalene may be readily carried out at elevated temperatures of about 80° C. in the presence of an alkali metal hydroxide. The diallyloxymethyl naphthalene may be readily separated from the reaction mix by filtration and distillation.

The invention will be illustrated further by the following examples:

*Example I*

To a flask equipped with a reflux condenser and a thermometer is charged a mixture of 600 grams of an aqueous solution of formaldehyde (30% strength) and 400 grams of concentrated hydrochloric acid. Then 180 grams of naphthalene is added. The mixture is then heated to reflux and with stirring a current of gaseous hydrochloric acid is introduced for about 12 hours. After cooling, the solid product is separated from the mother liquor and washed with water. The crude bis

*Example III*

A mixture was made, by weight, or 1 part of bis(allyloxymethyl)naphthalene, nine parts of allyl methacrylate, and ten parts of methyl methacrylate and 0.02 part of benzoyl peroxide. The mixture was heated to 80° C. for twenty minutes, cooled rapidly, and poured into a mold and thereafter heated for forty-eight hours at 40° C. The cast was removed from the mold. It could be softened and shaped after heating to 100° C. Further heating to a higher temperature, such as to 150° C. rendered the material substantially infusible.

I claim:

A bis(allyloxymethyl) naphthalene composition consisting essentially of a mixture of 1,4-diallyloxymethyl naphthalene and 1,5-diallyloxymethyl naphthalene, said mixture being further characterized as a colorless oily liquid having about the same viscosity as xylene, a distillation temperature range of 170–177° C. at 6 millimeters pressure, and an iodine number of 189.

References Cited by the Examiner
UNITED STATES PATENTS 2,722,555 11/1955 Amidon _____ 260—611
3,048,600 8/1962 Jaruzelski _____ 260—611 X BERNARD HELFIN, *Primary Examiner.*

LEON ZITVER, *Assistant Examiner.*